United States Patent [19]

Bechtold

[11] 4,305,646

[45] Dec. 15, 1981

[54] OPTICAL SYSTEM FOR ELECTRO-OPTICAL SCANNER

[75] Inventor: Edwin Bechtold, Plandome Manor, N.Y.

[73] Assignee: Eltra Corporation, Toledo, Ohio

[21] Appl. No.: 95,894

[22] Filed: Nov. 19, 1979

[51] Int. Cl.³ .............. B41B 21/08; H04N 3/10; G02B 27/17

[52] U.S. Cl. ........................... 354/5; 350/6.7; 358/285

[58] Field of Search ......... 350/6.7; 358/285; 356/308; 354/5, 6

[56] References Cited

U.S. PATENT DOCUMENTS

| | | | |
|---|---|---|---|
| 3,694,657 | 9/1972 | Brooks | 250/216 |
| 3,863,262 | 1/1975 | Crofut et al. | 354/5 |
| 3,882,273 | 5/1975 | Knox | 178/7.6 |
| 3,900,851 | 8/1975 | Bucy et al. | 346/49 |
| 3,984,171 | 10/1976 | Hotchkiss | 350/6.7 |
| 4,000,493 | 12/1976 | Spaulding et al. | 354/5 X |
| 4,170,028 | 10/1979 | De Benedictis et al. | 358/285 |

*Primary Examiner*—Donald A. Griffin
*Attorney, Agent, or Firm*—Joel I. Rosenblatt; James P. DeClercq

[57] ABSTRACT

An electrophotographic typesetter including a scanning system having a light source, means for receiving said light from said source and rotationally scanning said light through a curvilinear scanning locus, means for receiving said curvilinear scanned light and redirecting the light onto a straight line scanning locus, said redirecting means redirecting the light at an angle to the incident light, said means for producing said curvilinear scanned locus having an axis of rotation, said means for redirecting having a center of curvature, and wherein said straight line scanning locus is on a plane passing through said center of curvature, and perpendicular to said axis of rotation.

19 Claims, 21 Drawing Figures

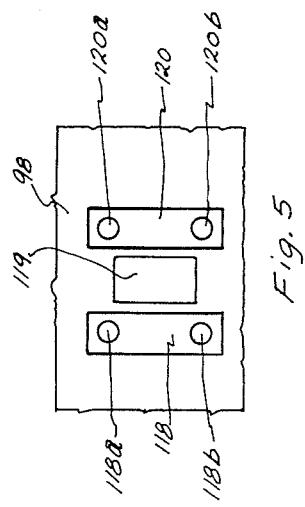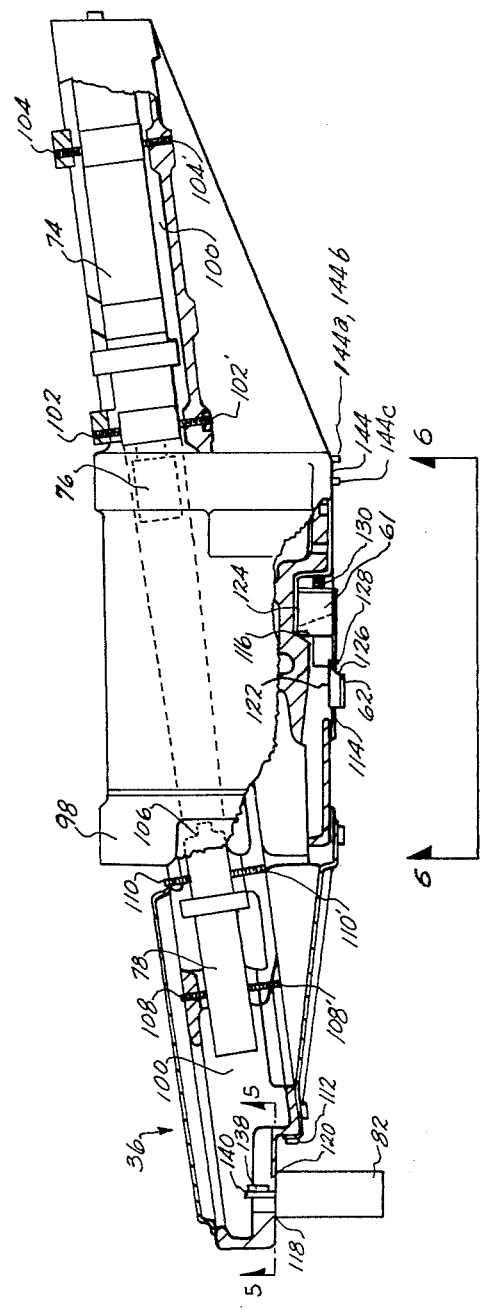

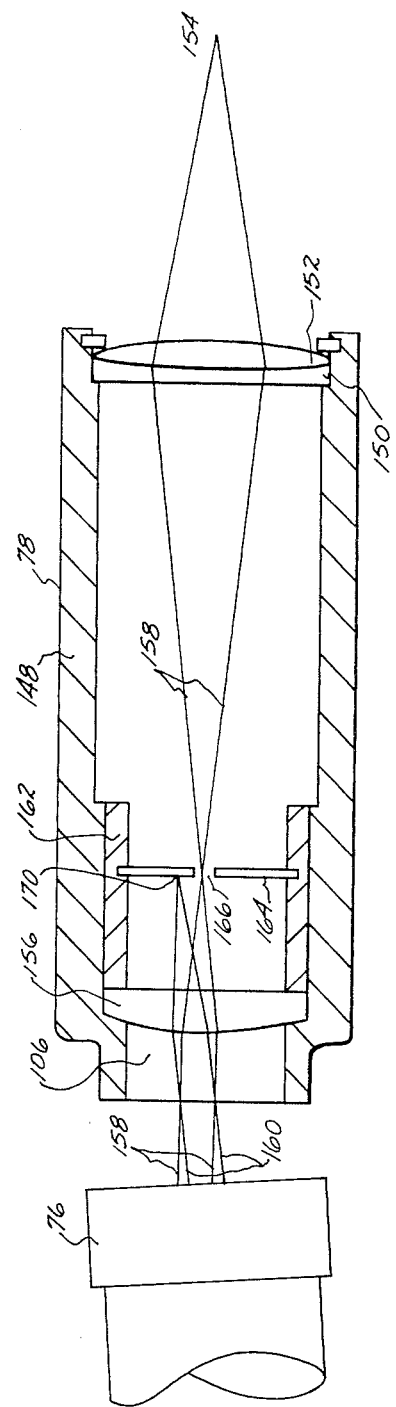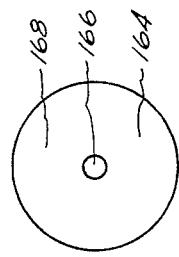

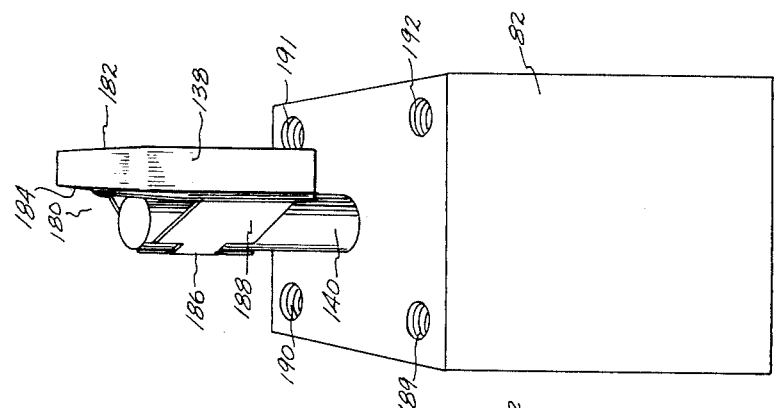
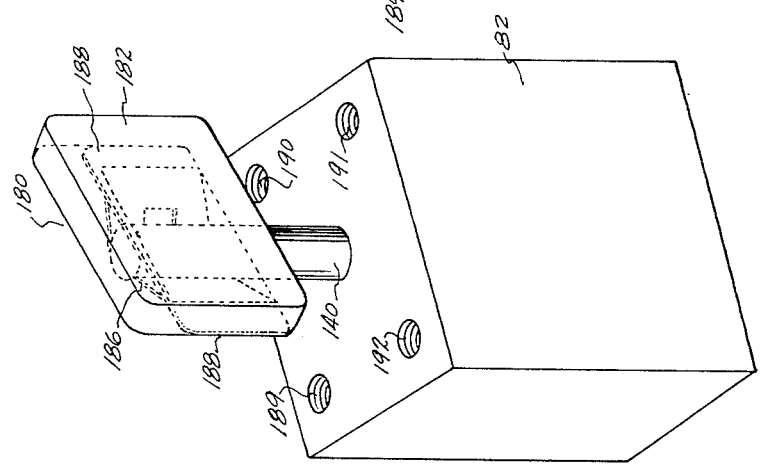
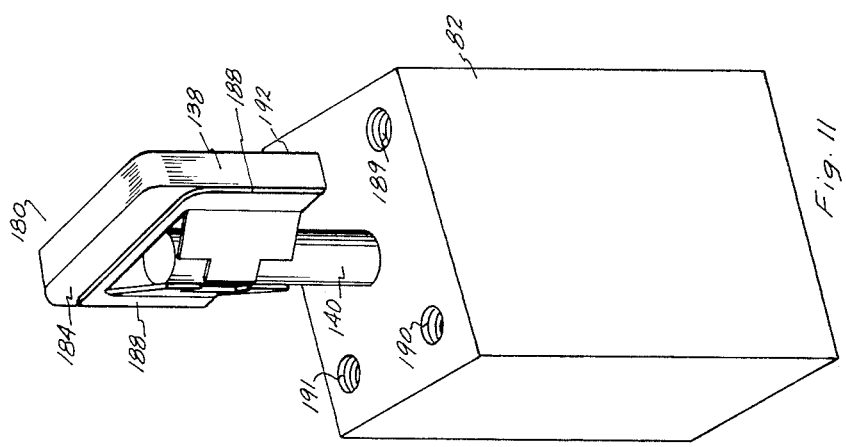

OPTICAL SYSTEM FOR ELECTRO-OPTICAL SCANNER

CROSS-REFERENCE TO RELATED APPLICATIONS

The subject matter of this application is related to that of the commonly-owned U.S. patent application Ser. No. 950,242, filed Oct. 10, 1978, entitled "Digital Typesetter"; U.S. patent application Ser. No. 37,698, filed May 10, 1979, entitled "Electrophotographic Apparatus for Providing Dry Developed Output from a Typesetter"; and to U.S. patent application Ser. No. 097,281, filed Nov. 26, 1979, entitled "Scanning and Control System for Electro Optical Printer," and to U.S. patent application Ser. No. 095,895, filed Nov. 19, 1979, entitled "Optical System for Electrooptical Scanner."

FIELD OF THE INVENTION

This invention relates to an apparatus for forming images by scanning a light sensitive surface with a modulated light source such as a laser. Its particular utilization is in the printing or typesetting field.

BACKGROUND OF THE INVENTION

Systems for modulating a light such as a laser beam and scanning that modulated light through an optical path to a light sensitive surface are well-known.

Such a system is shown in U.S. Pat. No. 3,984,171 of Hotchkiss. The Hotchkiss patent shows a video signal modulating a laser output. The modulator is placed in the light path of the laser and may switch the laser beam electro-optically or acoustic-optically in response to digitized video information. A beam expander is placed in the light path to expand the diameter of the beam so it may be refocused to a spot size required by the resolution of the system. Additional typical components used within the light path are fold mirrors to change the direction of the light path and a spherical compensator to provide the desired straight line or linear continuous scan on the recording medium from the curvilinear scan.

In such known systems, a scanning mirror is mounted on a motor, such as a galvanometer motor, to drive the mirror and the reflected light beam through an arc.

In such a scanning arrangement, it is desirable to maintain the optical path length as short as possible. The shortened optical path provides a diminished sensitivity to changes in the location of the various components of the optical path due to changes in temperature and other causes, as well as diminishing the sensitivity of any adjustments which may be required by the components and their locations. Additionally, a shortened optical path also enables a smaller, more compact unit to be built, with attendant savings in weight and space.

Additionally, a shortened light path requires less sensitive adjustment to convert the curvilinear scan of an oscillating mirror to a distortionless linear scan. A shortened light path also reduces light losses and scattering within the system which may reduce the quality of the system output, and minimizes energy required by the system.

The prior art arrangement of elements within an optical light path has some of the elements arranged independently of all of the other elements, requiring individual adjustment of these independently arranged elements relative to each other. This required a multiple step assembly operation where each of the elements had to be mounted, and then critically aligned with each other so that the optical path was within desired tolerances. In other cases where some of the elements were aligned with each other by an assembly having a common reference plane, the optical path including the photosensitive material transport was assembled separately from the optical assembly, and required individual adjustment to minimize any out of tolerance condition leading to distortion of the scan at the light sensitive surface.

This invention relates to the field of matrix printers and display devices wherein characters such as alphanumeric characters are generated by controlling a spot forming device that traverses or scans a copy area. More particularly, this invention relates to a mechanism for controlling the spot forming device as it traverses or scans a scanning path in a raster pattern that covers the area of a page of text. An application of this invention may be in a printing system such as an electrophotographic typesetting system wherein type characters are generated by a modulated light spot that scans a fixed linear path on the surface of an electrophotographic material, to selectively discharge areas of the page. This process places on the photoconductive surface an electrostatic image of text symbols which are developed and transferred to form a final copy by techniques somewhat similar to those currently employed in known electrostatagraphic copy machines. The preferred embodiment of such a machine disclosed in copending application U.S. Ser. No. 037,698 filed May 10, 1979 and assigned to the common assignee.

The modulated light spot, and the raster scan, are controlled by a digital processor, which turns the spot forming device on and off in response to character contour data in normalized coordinates in a first digital memory, and input data on the desired locations on a page of the selected characters in a second digital memory.

A laser beam is used for the light source which is driven through a scanning arc by a scanning means such as an oscillating mirror. A light source such as a laser may be used in this device, wherein characters are electronically generated by repeatedly and rapidly scanning a beam of laser light across the image receiving medium. During scanning, the light beam is electronically switched on and off thereby forming a raster line which extends either vertically perpendicular to the line of characters or horizontally parallel to the lines of characters. The switching device is preferably a conventional acoustical optical modulator. Light from the modulator is reflected from a scanning mirror which creates a curvilinear scanned beam.

The output of the laser is a bundle of light rays which may be either larger or smaller than the resolution required by the system. The light rays must be focused to a spot compatible with the system resolution.

In accordance with the invention, a beam expander is placed in the optical path between the modulator and the scanning means. The beam expander, as in a Kepplerian telescope or a compound microscope, focuses the entering light rays on a first real image area smaller than the area of the ray bundle entering the beam expander. Then, in accordance with known optical techniques, the image at this first real focused area is expanded through the beam expander optics and then refocused on the photosensitive material. In accordance with known optical principles, the resolution, or the minimum spot size on the photosensitive surface, is a function of the size of the real imaged area produced in the beam expander, and is directly proportional to the size of the real focused spot produced within the beam expander. To obtain a sufficiently small spot in the system focal plane at the photosensitive image surface, a smaller spot size is required at the above described first real focused area within the beam expander.

In a preferred embodiment of the invention, an acoustical optical modulator produces light along two principle axes, a zero order axis and a first order axis. The first order axis corresponds to the energized or switched state of the modulator. An apertured stop is provided on the principle first order axis. The light of the first order then passes through the aperture, while zero order light is blocked.

The use of this apertured stop within the beam expander is particularly advantageous with this system where the modulator is placed between the light source and the beam expander.

In this system, a beam expander is used to focus the light from the laser to the aforesaid first real image spot. This focused spot is then reimaged through the beam expander and refocused onto the imaging surface to a cross-sectional area consistent with the resolution of the system.

The function of the beam expander is combined with the function of the modulator and with the apertured stop whereby the modulated light is imaged within the beam expander at its internal focal plane, and at a distance where the normally overlapping beams from the modulator have been separated by the optics of the beam expander. The beam expander optics separate the overlapping beams, and the apertured stop blocks the undesired beam, at a distance from the modulator where the angularly separated beams otherwise would be overlapping each other. The beam expander optics focus one of the beams on a blocking portion of the light stop within the beam expander.

To summarize, the apertured stop is placed within the beam expander at a focal plane of the beam expander where each bundle of light rays is imaged to a small focused area and whereby overlapping between the first and zero order light beams is eliminated.

In this way, the use of the apertured stop within the beam expander permits the beams of the zero and first order to be separated at a distance from the modulator output, where they would otherwise be overlapping, and permits the location of the beam expander closer to the output of the modulator. In this way, the total light path is shortened, providing the advantage of minimizing the adjustments required to bring the light path within the angular tolerances and reducing the amount of adjustment required to minimize distortion within the light path.

An additional feature of the invention is the use of an optical assembly which provides a plurality of mounting surfaces, referenced to a reference plane. According to the invention, portions of the light path elements, including the scanning mirror, the spherical correcting mirror and any fold mirrors are mounted on a common optical assembly, eliminating the need for any adjustments after the mounting step is completed. Additionally, and according to the principles of this invention, the photosensitive material transport is also mounted on the optical assembly and on its respective surface referenced to a common reference plane so that the optical path from the scanning mirror to the imaging surface on the photosensitive material can be aligned merely be assemblying the components. Any need for further alignment of the imaging surface and transport is eliminated.

Additionally, the shortened optical path also provides the capability of minimizing the size of the package, minimizing space and material requirements.

The laser and modulator may be mounted on a reference machined surface, or, according to the preferred embodiment may be connected together and mounted within diametrically-opposed screw pairs, so both may be adjusted simultaneously relative to the optical path defined by the machined surfaces on the optical assembly.

The scanning means is a scanning mirror which drives the light beam in a curvilinear path. It is mounted against the shaft of a galvanometer motor, or any other suitable driving device, by means such as a spring clip. This spring clip draws the backside surface of the mirror against the shaft, assuring that the surface of the mirror is in contact with the surface of the shaft and is aligned with the axis of the shaft.

In general, the system incorporates the features described above in the cross-referenced phototypesetting system applications characterized by the use of a microprocessor driven CRT display for typesetting, composition support, digital font storage, and laser raster recording.

The system employs electrostatographic printing and produces a rapid and high quality output copy suitable for typesetting.

In a typesetting system, the quality of the copy is compared to that produced by metal type. Producing such quality presents difficulties especially where normalized encoded character contour digital data may be greatly "magnified" in forming larger characters. Maintaining suitable quality requires the features disclosed below, are in precise alignment in a minimum space, to produce a substantially distortionless scan. The features disclosed and claimed contribute to a high print quality. The novel arrangement of the beam expander reduces the length of the optical path, reducing the opportunity for irregularities in the beam, and the alignment means provide more precise alignment of the beam with the imaging surface. These combine to reduce misalignment and degradation of print quality due to vibration, temperature differences, and random unavoidable minor irregularities in optical components, providing print quality equal to that of metal type in a production environment.

Additionally disclosed in the system is an arrangement of the optical path defining the position of the scanning mirror axis of rotation, the center of curvature of the spherical compensating reflector, and the system focal plane. In particular, the straight line scan locus is produced at a focal plane perpendicular to the axis of rotation of the scanning device, as well as passing through the center of curvature of the spherical compensating off-axis reflector as explained below.

This relationship is not disclosed in the prior art wherein the combination of the off-axis compensating spherical mirror and a light source scanned through an arc, produces the desired straight line locus in an off-axis system, substantially free from distortion.

BRIEF DESCRIPTION OF THE DRAWINGS

FIG. 4 is a side-elevational view, partially in section, of a first support structure according to the invention, showing the optical components of a recorder according to the invention.

FIG. 5 is a fractional view of FIG. 4 taken in direction 5—5.

FIG. 8 is a sectional view of a beam expander according to the invention.

FIG. 8a is a perspective view of an apertured stop of the device shown in FIG. 7.

FIGS. 11, 11a and 11b illustrate the structure for mounting a reflecting mirror to a galvanometer motor shaft according to the invention.

DETAILED DESCRIPTION OF THE INVENTION

Figure 1:
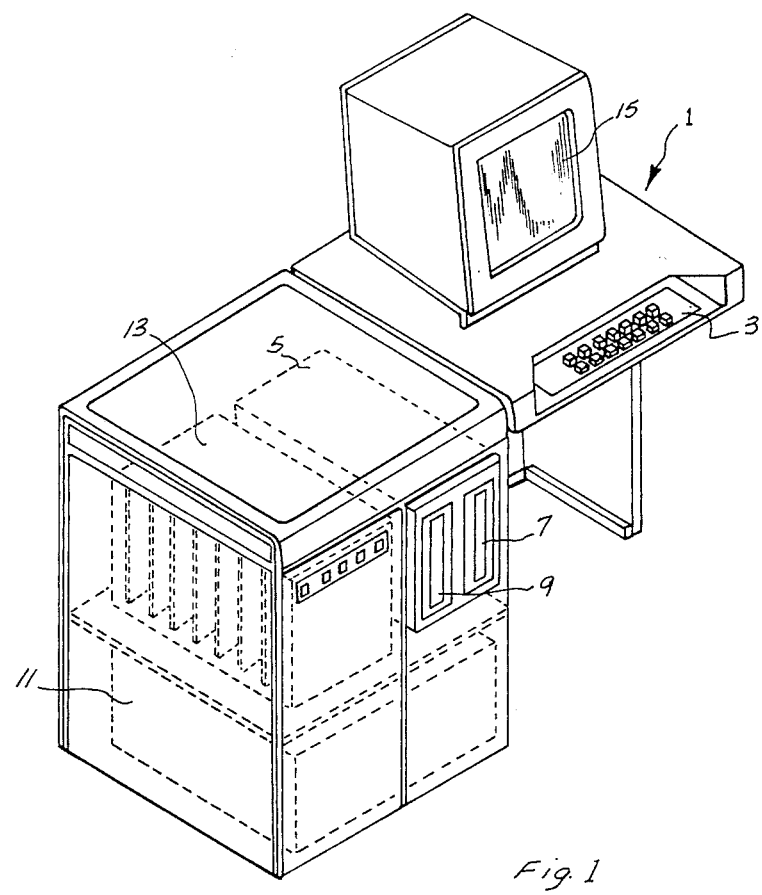
FIG. 1 is a perspective view of a keyboard, display terminal, and input and output data systems in accordance with the invention.
Figure 2:
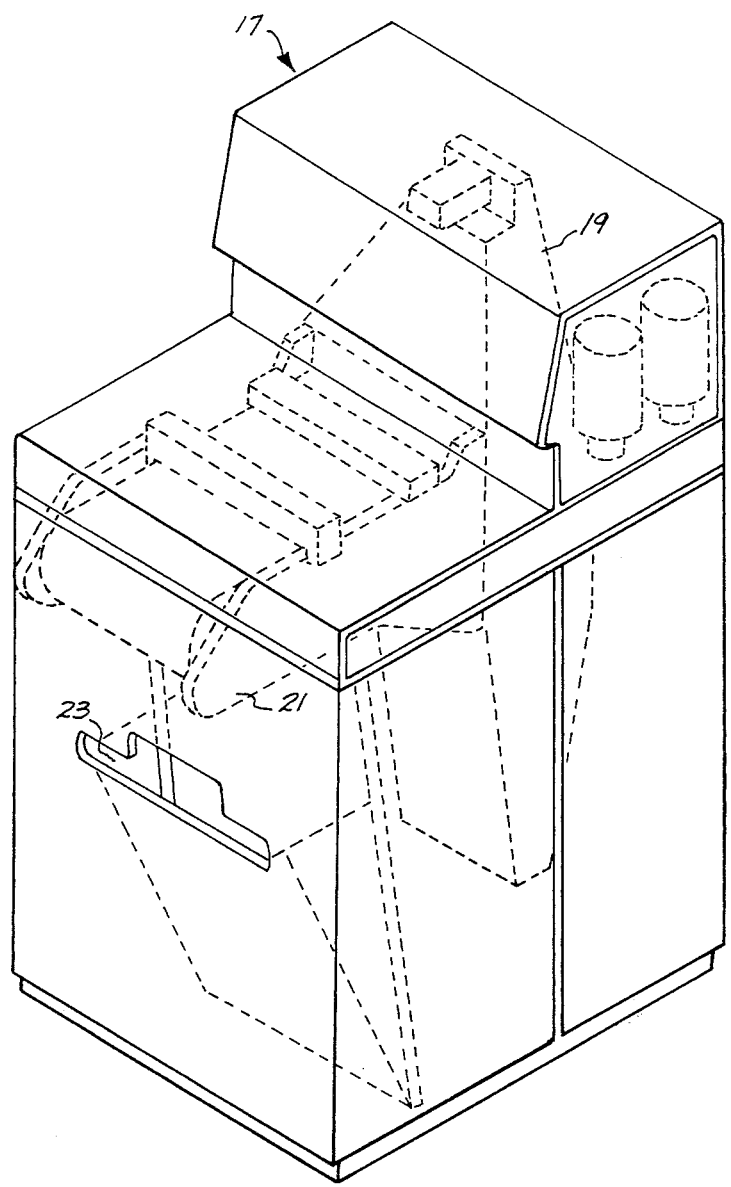
FIG. 2 is a perspective view of a recorder according to the invention.

A block diagram of the system is shown in FIGS. 1 and 2, illustrating three subsystems, a keyboard and display terminal, input and output data system, and the recorder system. The keyboard display terminal provides data processing facilities for job input, file creation and management, hyphenation and justification, page composition support, outline formating, font management, and typesetting control.

The input output data system performs font and data processing, raster data conversion, raster line assembly and recorder subsystem control.

The recorder subsystem is directed by the output data system to generate a modulated raster line, and to control the movement of paper through the loading, processing and unloading of the finished output.

The output data system for this system is generally described in copending application U.S. Ser. No. 950,242, filed Oct. 10, 1978, and assigned to the common assignee. That application describes an electronic data processing system where a normalized character is stored in memory. The processing system receives digital data defining the character identity, form, font size, and placement of the characters to be typeset from the keyboard or from disc or paper storage. It receives second digital data from the font memory defining the contour of each character with respect to a normalized encoding set of first and second coordinates and produces a third set of digital data to define character boundaries intersecting a raster or scan line. The third digital data, corresponding to the video information, is connected to an acoustical optical modulator for modulating the light directed on the imaging medium along successive raster lines. Coordinated drive means are also produced for moving the print medium in a direction transverse to the direction of the raster scan line.

As stated in the description of the copending application, the second digital data defining the contour of each character comprises digital numbers defining X and Y coordinates of the start points of character outlines and digital numbers defining the length and direction of a plurality of straight line vectors extending successively along the character outline, from the start points. The length and direction of each vector is represented by the first coordinate distance dx and the second coordinate distance dy from one end of the vector to the other. In accordance with this system, the digital numbers defining the vectors are arranged such that the vectors comprising an entire string are successively defined before defining the vectors of another string. Further details are provided in the copending patent applications and are, therefore, not provided in this description.

FIG. 1 shows a front view of the keyboard display console indicated generally by numeral 1.

Mounted on the console assembly 1 is a keyboard 3 capable of inputting to the processing system digital data defining the identity, form, size, and placement of characters to be printed. Any other suitable input device such as paper tape, magnetic tape, disc readers, a computer, or a data transmission channel may be used.

A floppy disc drive 5 may be provided in the system with one disc, for example, the disc of drive 7 containing the digital data corresponding to the first digital data, while the disc of drive 9 may contain the digital data corresponding to the font information or second digital data. A microcomputer control unit and memory space are contained with the input data subsystem 11.

The output data processing system for computing the points on each raster line, at which the laser scanning beam must be turned off and on, is contained in the output data processing subsystem 13.

A CRT soft display 15 is shown mounted on top of the keyboard display console. The microprocessor control unit located in the input data subsystem 11 may be used, for example, to display the information placed into the system by means of the keyboard terminal 3 on CRT 15.

Figure 3:
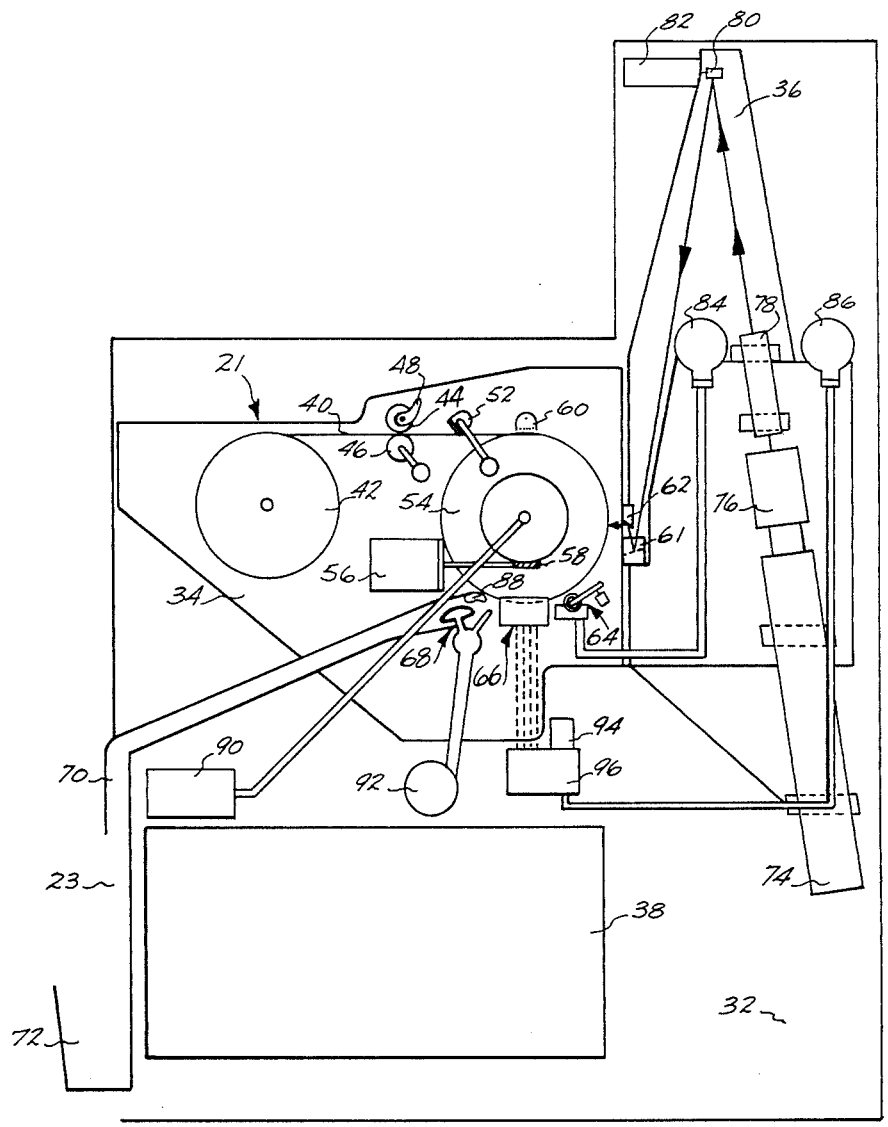
FIG. 3 is a schematic side-elevational view of a recorder according to the invention.

The recorder console is shown in FIG. 2 and In a schematic view in FIG. 3. As shown in FIG. 2, the recorder console is indicated generally by numeral 17 having an optical support subassembly 19, and a copy material transport 21 described in greater detail in the following. A copy delivery slot 23 is provided for receiving the dry finished output of the recorder.

FIG. 3 shows the schematic diagram of the recorder console which is substantially as described in U.S. Ser. No. 37,698, filed Oct. 10, 1978 and assigned to the common assignee.

This recorder apparatus comprises a frame 32 on which are mounted the paper transport 34 and the optical support assembly 36, as well as power supplies 38. The image receiving medium web 40 is supplied from a replaceable web roll 42 and passed through a pair of feed rollers 44 and 46. The upper feed roller 44 is normally spring biased downward against the lower feed roller 46 but may be released by pressing a lever 48. The lower feed roller 46 may be driven by a motor (not shown) to move the web 40 forward.

The web 40 is passed to a cutter 52 which cuts the web into sheets approximately 19 inches (49 cm.) in length. These sheets are wrapped around a rotatable drum 54, 21 inches (53 cm.) in circumference in the preferred embodiment and held in place by vacuum applied through apertures in the outer surface of the drum and as shown in the aforementioned copending application. The drum is driven at the desired speed by a motor 56 acting through a work gear 58. Surrounding the drum in a clockwise direction are a corotron 60, an exposing system comprising mirrors 61 and 62, a prewetting device 64, a developing device 66 and a drying device 68. After drying the paper sheet is passed through a chute 70 and deposited in a "basket" 72.

The exposing system, shown in greater detail in FIGS. 3–9, repeatedly and rapidly scans a beam of light across the width of the paper web 40. The light beam is generated by a laser 74 and is switched in response to an electronic control signal by a modulator 76. The modulator may be an acoustical optical modulator or any other suitable modulation device. The beam is then passed through a beam expander shown as the beam expander 78, and is reflected from a scanning device 80, driven through a scanning arc by drive 82. Thereafter, the beam is reflected from a spherical mirror 61 which serves as a field flattener. Finally, the beam is folded and reflected into the horizontal plane by a stationary plane mirror 62.

As may be seen, the prewetting device 64 is replenished with liquid dispersants from a bottle 84, and the developing device is replenished with toner concentrates from a bottle 86. Finger 88 is provided adjacent the drying device 68 to remove the leading edge of the paper sheet from the drum 54.

Near the lower part of the frame 32 is arranged a vacuum pump 90 connected to draw air from the interior of the drum 54. A blower 92 is connected to supply air to the drying device 68. A toner recirculating pump 94 and a reservoir 96 are operative to pass liquid toner to, and receive toner from the developing device 66.

Referring now to FIG. 4, the optical support assembly is shown in detail in a partial cross-sectional view and to FIG. 5 where a view of the optical assembly along sectional lines 5—5 is shown.

As shown in FIG. 4, the casting 98 contains a cavity area 100 for locating the optical components. Mounted in the cavity are a laser 74 supported at two separated locations 102-102' and 104-104' by diametrically opposed set screws, it being understood that 90° from the location of each opposed set screw pair are a second diametrically opposed pair so that the laser may be adjusted in two axes. A modulator 76 (shown in phantom) is integrally connected to the laser 74 but may be similarly supported by pairs of diametrically opposed screws (not shown). In the preferred embodiment of the invention, adjustment of the opposed set screws is the only adjustment made at assembly. The very small adjustment to align the output of modulator 76 with the optical axis can be accomplished more readily in this manner.

A beam expander 78 is located with its input optical port 106 facing the output optical port of modulator 76. The beam expander 78 may be supported in a manner similar to the laser by opposed screw pairs 108-108' and pairs 110-110', as well as respective 90° displaced pairs (not shown).

In the preferred embodiment, modulator 76 is attached directly to the output port of laser 74. This allows adjustment of the position of laser 74 to also align the first order beam from modulator 76 with the optical axis of the system, reducing the number of adjustments needed in manufacture of a device in accordance with the invention, since beam expander 78 may then be easily and conveniently aligned with the first order beam. In this regard, it should be noted that a conventional, commercially available modulator 76 has an integral angular adjustment, but for adjusting an internal element so that the condition for "Bragg Angle" diffraction is satisfied, and not for alignment of the first order beam path with the optical axis. This positioning of the modulator also yields more efficient modulation, since efficiency of an acoustic optical modulator decreases as area used increases.

The casting 98 additionally includes machined surfaces for location of certain optical components such as a spherical off-axis mirror, a scanning mirror, a fold mirror, and the paper transport. All surfaces are referenced to common surface 144. Surface 116 is a second reference surface perpendicular to surface 144. Surfaces 112, 114 are machined parallel to surface 116. A center line passing through the axes of dowels 144a and 144b, of the same diameter, is parallel to surface 116. Surfaces parallel to surface 144 are machined surfaces 118, 120, 122 and 124. Dowels 144a and 144b cooperate with a machined surface on step 144d on transport 21, to vertically locate the transport 21 relative to the casting 98. Dowel 144c cooperates with a machined surface, not shown, to laterally locate the transport 21. Surface 144 provides a mounting surface for the transport 21. The transport is then aligned in three alignment planes relative to the optical path.

Figure 6:
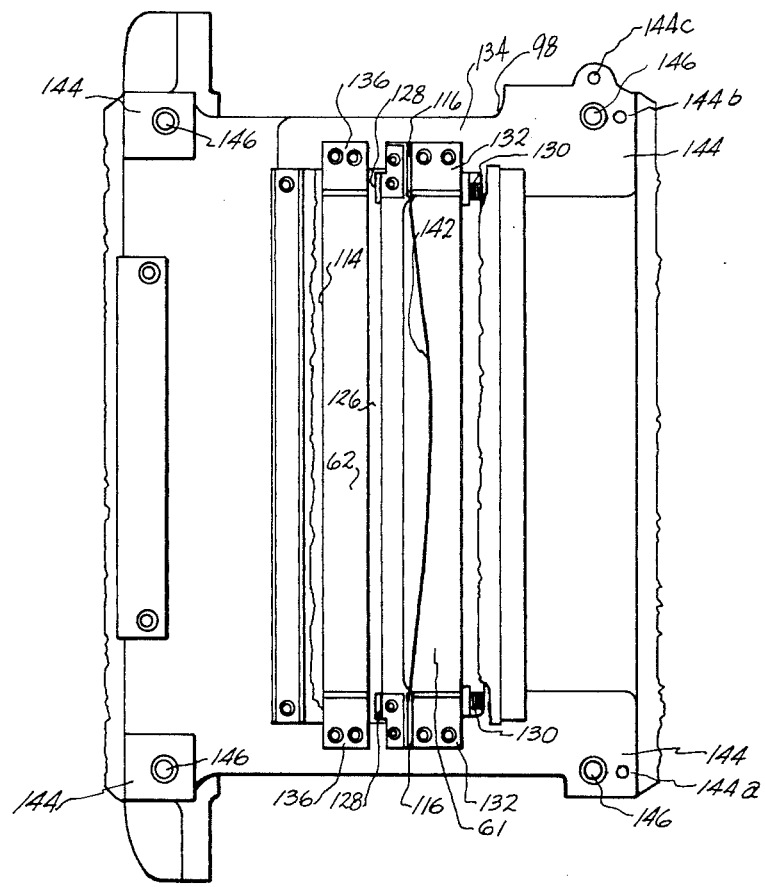
FIG. 6 is a fractional front view of FIG. 4 taken in direction 6—6.

The reflecting surface face 126 of the diagonal fold mirror 62 can be seen in FIGS. 4 and 6. A set of clips shown as clips 128 are provided at each end of the diagonal mirror 62 for simultaneously holding the diagonal mirror 62 in place against machined surfaces 114 and 122. A set of springs 130 are shown for holding the spherical mirror 61 against reference machined surface 116. A set of clips shown as clips 136, mounted to the face 134 of casting 98 provides additional support for the fold mirror 62.

Figure 7:
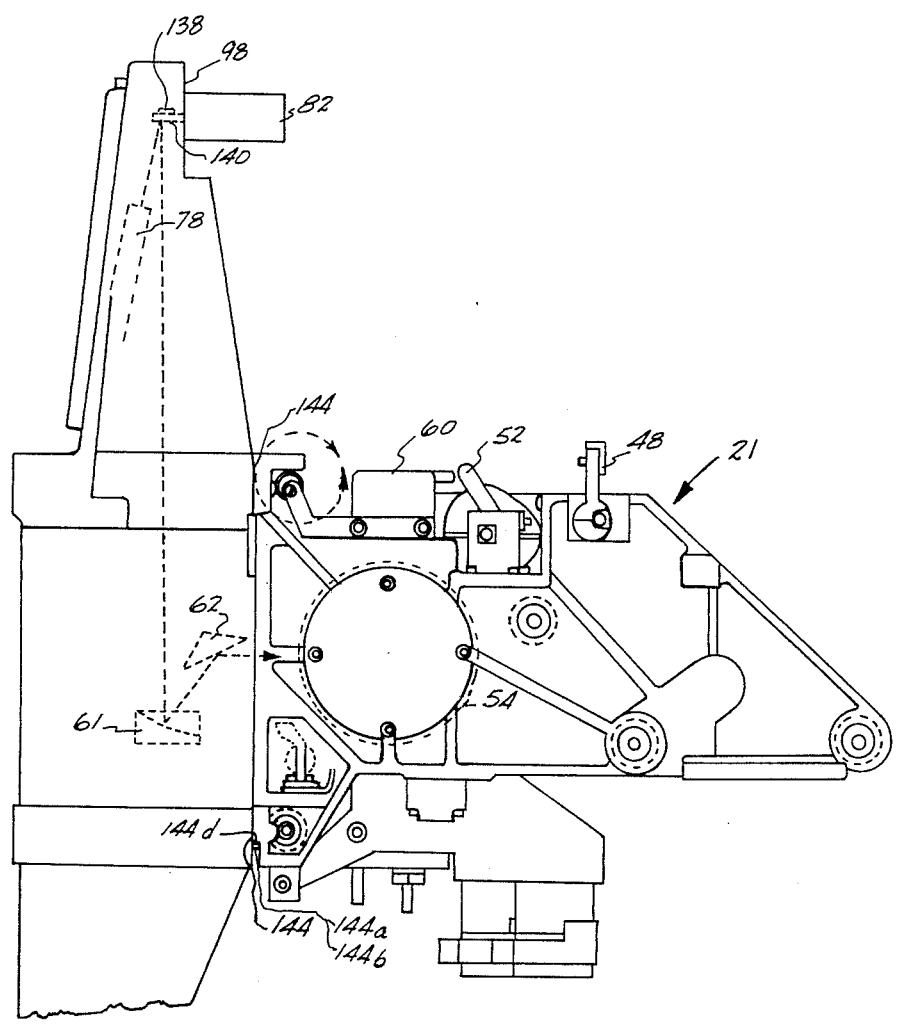
FIG. 7 is a schematic side-elevational view of the mechanism of a recorder according to the invention.

A scanning means shown as rotating mirror 138 in FIG. 7 is shown mounted on a shaft 140. The shaft is in turn attached to a drive means, such as a galvanometer drive 82. The galvanometer drive 82 is mounted on machined surfaces 118 and 120 by suitable mounting means attached to the galvanometer drive 82. These mounting means are shown in greater detail in FIGS. 5, 11, 11a, and 11b. The optical path is from the laser 74, through the modulator 76, through beam expander 78, to the scanning mirror 138, the galvanometer drive 82 reciprocates scanning mirror 138 through a curvilinear path and causes the light from the modulator to scan across the spherical compensating mirror 61 in an arc corresponding to the arc 142 shown on the spherical compensating mirror surface in FIG. 6.

The light is then reflected to the face 126 of the fold mirror 62, and out of the plane of FIG. 6, to the paper transport.

FIG. 5 shows a detail view of the configuration of mounting surfaces 118 and 120. A machined mounting surface 118 is provided with apertures 118a and 118b. A machined mounting surface 120 is provided with apertures 120a and 120b. An aperture 119 is provided in casting 98. As will be further described below, bolts are passed through apertures 118a, 118b, 120a and 120b to retain a machined surface of galvanometer drive 82 against surfaces 118 and 120. Shaft 140, carrying mirror 138, is passed through aperture 119.

As stated above, this optical assembly provides reference planes for mounting the optical components for reflecting the light towards the paper transport, as well as reference planes for mounting the paper transport itself. In this way, all of the optical components are automatically placed in alignment with each other upon assembly.

Conventionally, shims are used as necessary where compensation must be added to maintain the optical portion of the system in alignment. In the preferred embodiment of the invention, such shims are not required, due to precise machining of the reference surfaces, the shortness of the optical path, and other features described herein. This is a significant advantage of the invention allowing full replacement of optical elements and the image surface transport without realignment.

For the purpose of mounting the image of paper transport, a set of machined pads are shown as pads 144 on the face 134 of casting 98. Located within each pad 144 is a threaded mounting hole 146 which may be used for attaching the paper transport. Other appropriate mounting means may be used.

The assembly of the paper transport on the optical assembly casting 98 is shown in FIG. 7. Referring to FIGS. 4, 5 and 7, the mounting pads 144 are referenced to the other and to mounting surfaces 114, 116, 118, 120, 122, and 124. In FIG. 6, four of the mounting surface pads 144 are shown, it being understood the other mounting surface pads may be added to the assembly casting 98. The rotatable drum 54 is shown within the optical path as shown by the arrow from the fold mirror 62 shown in phantom. The scanning mirror drive unit 82 is arranged at the top of the optical assembly casting 98 with shaft 140 and reflective surface of mirror 138 shown in phantom. A partial light path is shown from the beam expander to the scanning mirror 138 to the spherical compensating mirror 61, to the fold mirror 62 and to the rotating drum 54 where it is imaged on the light sensitive surface of web 40.

FIG. 8 shows the beam expander 78 in cross-section.

The beam expander designated by numeral 78 includes a case 148 enclosing a compound lens section 150, 152 for expanding the beam and focusing the beam on the light sensitive surface at focal point 154. A lens 156 is provided at the entrance port of the expander opposite the modulator 76.

The modulator 76 has two states, an energized state and an unenergized state.

The outputs of the modulator are light beams arranged as a first order beam 158 and a zero order beam 160. When the modulator is in its energized state, a majority of its light output will be directed from the modulator in its first order beam 158 and along the principle axis of the beam expander 78, and the remainder will pass undisturbed through modulator 76, in zero order beam 160. In its nonenergized state, light will be directed entirely in the zero order beam 160.

It should be noted that all beam sizes, distances, and angles as well as component spacings in schematic illustrations, are greatly exaggerated, since actual beam diameter is quite small, and modulator 76 creates a very small angular offset between beams 158 and 160. For instance, given an angular offset of 7.4 milliradians, and a beam diameter of 0.8 mm, it can be seen that beams 158 and 160 overlap for a considerable distance, without intervening optics in the light path.

A spacer 162 is provided to hold an apertured stop 164 having an aperture shown as 166. As shown and according to the principles of this invention, first order light from the modulator is focused and imaged at the location of aperture 166 and is reimaged by lenses 150 and 152.

According to known principles of optics, the smaller the area of real focused image of lens 156 at aperture 166, the smaller the image area focused by the compound expanding and objective lens comprising sections 150 and 152.

The real image at aperture 166, being at the focal point of lens 156, is then expanded and refocused through the compound lens 150 and 152 to focal point 154, corresponding to a spot on the scanned surface of the light sensitive imaging material. The compound lenses focus the diverging beam at point 154. It should be understood that the off-axis spherical compensating mirror, the fold mirror and scanning mirrors are interposed between focal point 154 and lenses 150 and 152, but are not shown in FIG. 8, for clarity of illustration.

The surface 168 of the apertured stop 164 shown in FIG. 8 is a light absorbing material and may be a black mat nonreflective finish or other suitable nonreflecting surface.

As shown, a beam of light entering the lens 156 off the principal axis of beam expander 78 is focused at point 170, removed from the aperture 166 on the black nonreflective, light absorbing surface 168 of the apertured light stop 164. The stop 164 blocks the zero order beam, while the first order beam passes through aperture 166.

Figure 9:
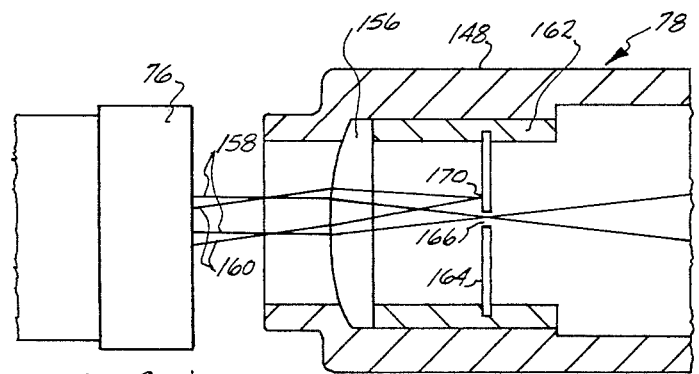
FIG. 9 is a fractional sectional view of the beam expander shown in FIG. 8.
Figure 10:
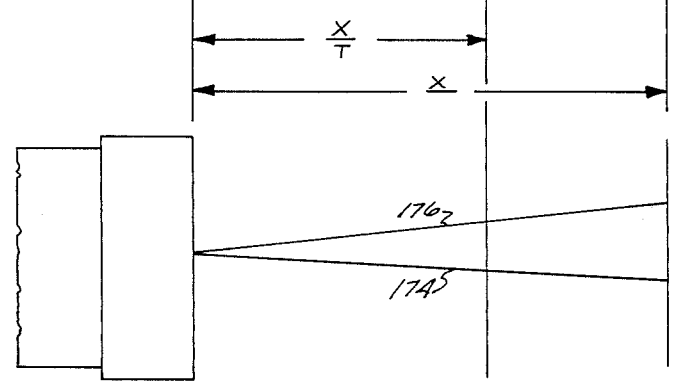
FIG. 10 is a schematic illustration showing the paths of light beams exiting a modulator according to the invention.

In operation, the beam expander is aligned along the first order principal axis 174 of the modulator output, as shown in FIGS. 9 and 10.

Figure 10A:
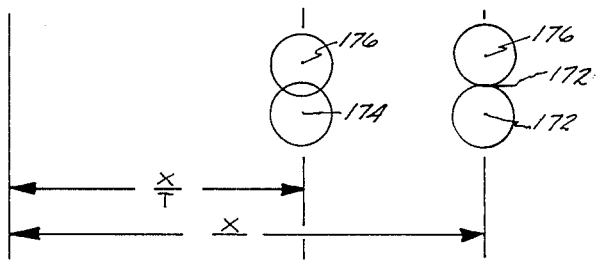
FIG. 10a is a schematic illustration showing the normal overlap of light beam existing a modulator according to the invention.

The output characteristic of the modulator is as shown in FIGS. 9, 10 and 10a. Up to a distance X from the output of the modulator, the zero order beam 160 and the first order beam 158 are overlapping. At distance X, as shown by FIG. 10a, the two beams contact each other at the point of tangency 172. For any location between X and the modulator output, the beams are overlapping, shown as location X/T in FIG. 10a.

As shown in FIG. 10a, the free beam light rays along principal axis 176 and principal axis 174 are not separated from each other until a distance X from the output of the modulator. The free beam path as shown is without any optical elements. At a distance less than X, the two beams overlap each other, and a conventional optical stop cannot be used to prevent beam 160 from passing through without blocking part of beam 158. It can be seen, therefore, that a conventional optical stop, permitting the light from beam 158 to pass without permitting any of beam 160 to pass or vice-versa, must be placed at least a distance X from the output of the modulator 76, where the beams are no longer overlapping. This would be at a distance greater than distance X where the beams were sufficiently separate due to the length of the beam and the small, approximately 7.4 milliradian angle between the beams from the zero and first order axes.

According to the principles of this invention, the aperture stop may be moved closer to the output of the modulator, locating it within the distance X where the first and second order free beam paths from the modulator would otherwise be overlapping.

Figure 10B:
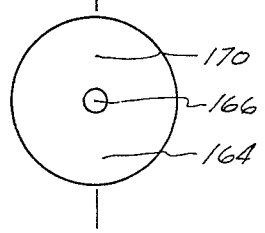
FIG. 10b is a front perspective view of the apertured stop shown in FIG. 7a, illustrating its function in blocking an undesired light beam.

This is made possible as shown by means of the optics of the novel beam expander. Referring now to FIGS. 8 through 10b the combined effect of the beam expander optics is to separate and select first and zero order beams otherwise overlapping each other as shown. As seen in FIGS. 9, 10 and 10a, the modulator provides coherent beams 158 and 160 along a first order axis 174 and zero order axis 176. FIGS. 10, 10a, and 10b show free beam paths at distance X from the output of the modulator as just touching each other at tangental points 172, and overlapping at every point along the linear distance X closer to the modulator 76.

As shown, the effect of the optics in the beam expander is to reduce the cross-sectional area of the beams by focusing the beams at the apertured stop 164, located in the focal plane of lens 156. By deflecting and reducing the area of the beams, they may be separated at a distance less than X. The apertured stop 164 may now be placed at a location corresponding to a distance from the modulator where free paths would otherwise be overlapping. In this way, the beam expander 78 may be brought closer to the modulator and within the distance X where the free beam paths overlap, to minimize the length of the light path, making the total system less sensitive to any misalignments, either at assembly or misalignments developing during use.

Further, such a shortened light path offers the additional advantage of enabling the total package, including the light path, to be made more compact, using less material and taking up less space.

Referring to FIGS. 11, 11a and 11b, the means for scanning the light beam is shown generally as 180, having a driver means 82 which may be a galvanometer motor or any other suitable motor capable of driving shaft 140 through an arc. Attached to shaft 140 is a reflecting mirror body 138 which is held to the shaft 140 at its backside 184 by means of a fastening means 186 attached to the backside of the reflective body 138 at areas 188, forcing the backside 184 of the reflective body 138 against the shaft 140 in a line of contact parallel to the axis of the shaft along the surface of the shaft. By this simple fastening means, the surface of the reflecting body is held against the shaft and in alignment with the shaft in the direction of its principal axis.

In the preferred embodiment, fastening means 186 is a spring clip glued to surface 184. This produces more accurate alignment than the previously known technique of simply gluing a mirror to a galvanometer shaft, and contributes to the ease of manufacture of the instant invention.

A mounting means shown as threaded holes 189, 190, 191 and 192 may be used to mount the scanning means on the machined surfaces 118 and 120, by passing bolts through apertures 118a, 118b, 120a and 120b into threaded holes 189-192.

Figure 12:
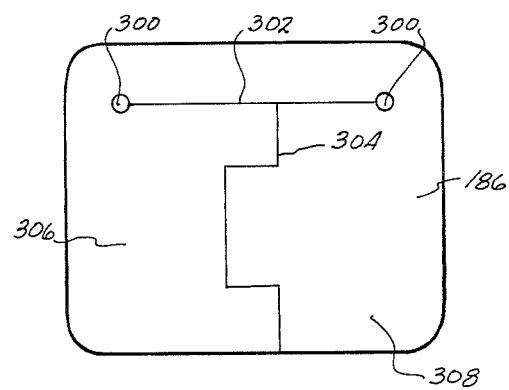
FIGS. 12, 12a and 12b are elevational views illustrating the formation and use of a spring clip for mounting a reflecting mirror to a galvanometer shaft according to the invention.
Figure 12A:
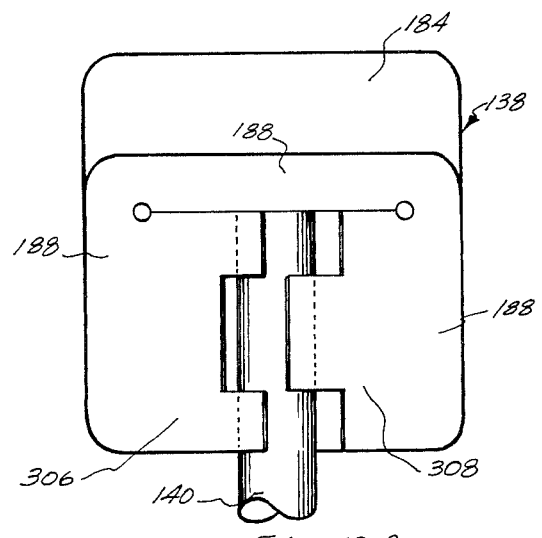
Figure 12B:
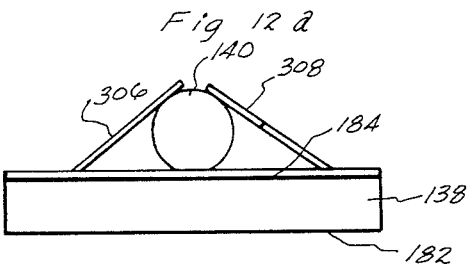

Referring to FIGS. 12, 12a, and 12b, fastening means 186 is a spring clip fabricated from a flat piece of spring material, having two strain relief holes 300 at opposite ends of a shear line 302, and a stepped shear line 304, forming an interdigitated edge of arms 306 and 308. As shown in FIGS. 12a and 12b, arms 306 and 308 are deflected out of the plane of the remainder of spring clip 186 before spring clip 186 is heat treated to give it spring characteristics, leaving a U-shaped area of spring clip 186 in its original plane. In FIG. 12a, this U-shaped area is identified as 188, which is the area attached by gluing to the back surface 184 of mirror 138. As can be seen from FIGS. 12a and 12b, arms 306 and 308 serve as springs to hold shaft 140 against surface 184 of mirror 138, while the base portion of U-shaped area 188 serves as a stop to properly position mirror 138 axially on shaft 140, while arms 306 and 308 supply centering, as well as retaining forces, aligning shaft 140 with the center line of mirror 138. In this manner, mirror 138 is properly positioned with respect to shaft 140 by merely sliding shaft 140 under spring clip 186. It would then be desirable, although not necessary, to apply a small amount of glue to the spring clip 186, shaft 140, and backside 184, to insure that this alignment will not be disturbed by shock and vibration while the apparatus according to the invention is in use. As installed, shaft 140 is received in the space between arms 306 and 308 and backside 184, and its end abuts the base portion of U-shaped area 188.

Figure 13:
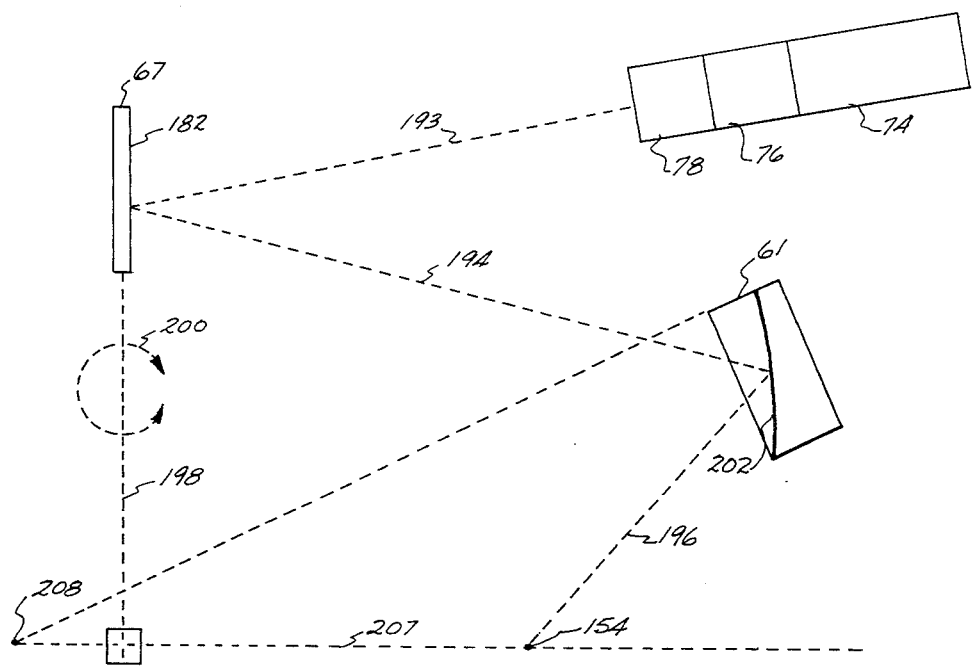
FIG. 13 is a schematic view showing the optical system and light path in the preferred embodiment of the invention, taken in a direction equivalent to the side elevational view of FIG. 4.
Figure 13A:
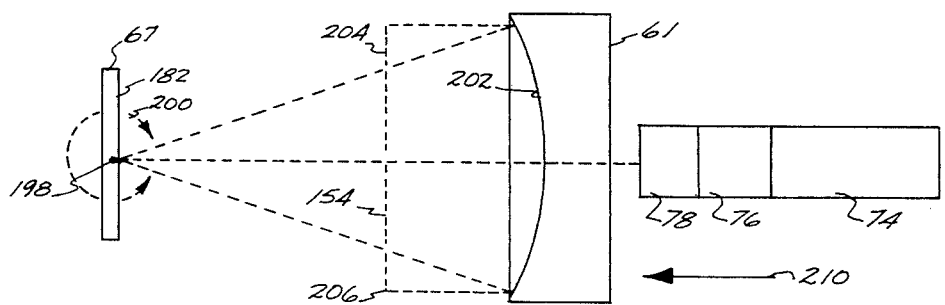
FIG. 13a is a schematic view showing the original system and the light path in the preferred embodiment of the invention, taken as a rear elevational view of the embodiment shown in FIGS. 2 and 3.

Referring now to FIGS. 13 and 13a the optical system in schematic form is shown.

The optical system comprises a light source, which may be a laser shown as 74, directed through a modulator 76, and an optical means 78 for focusing the light source at a focal point 154. The focal length of the optical light path is shown by the connecting lines 193, 194 and 196, defining the optical light path. A means for scanning the light from the output of the optical means 78 through an arc, to produce a curvilinear scanning locus is shown as reflective mirror 67 having reflective surface 182 and rotated about its axis 198, as shown by the arrows 200. The scanning surface 182 directs the scanned light to the compensating spherical reflector 61, a chordal segment having reflective surface 202, which redirects the incident light at an angle. The light redirected from the spherical reflector through lighthpath 196 is imaged on a straight line scanning locus as shown by focal point 154.

The focal point 154 is actually a straight line locus, described by a line perpendicular to the plane of the paper, and passing through point 154. The curvilinear scanning locus is changed to the straight line locus through point 154 by the off-axis compensating spherical reflector 61. As shown in FIG. 13a, point 154 is shown on a straight line locus at the focal plane of the optical means 78, and extending between the end points 204 and 206.

As shown, the nature of the compensating spherical reflector is to produce a straight line scanning locus from the curvilinear path produced by the scanning mirror means 67. The system then is capable of converting the curvilinear locus to a substantially distortion free straight line locus shown as line 204 to 206 on the imaging surface.

The plane 207 defined by the center of curvature of the spherical mirror 61, shown as 208, and the straight line scanning locus shown as 204, 206, is perpendicular to axis of rotation 198 of the scanning mirror 67. The length of the curvilinear path of the light beam on mirror 61 is substantially equal to the length of the straight line scanning locus, further reducing the chance of distortion from minor mirror irregularities and the like.

The light sensitive imaging surface may be advanced as shown by arrow 210 substantially perpendicular to the direction of the straight line scanned locus.

The advantage of this off-axis system, is that no additional lenses are needed to eliminate distortion or to shape the light beam. The preferred arrangement of the optical light path elements to convert the curvilinear scanned locus into a straight line locus, is used without additional optical elements such as expensive cylindrical lenses to produce a substantially distortion-free straight line locus at the focal point of the optical system.

Numerous modifications, and variations of the above-disclosed invention will be apparent to one skilled in the art without departing from the spirit and scope of the invention.

I claim:

1. An electrophotographic typesetter including a scanning system having a light source, means for receiving said light from said source and rotationally scanning said light through a curvilinear scanning locus, means for receiving said curvilinear scanned light and redirecting the light onto a straight line scanning locus, said redirecting means redirecting the light at an angle to the incident light, said means for producing said curvilinear scanned locus having an axis of rotation, said means for redirecting having a center of curvature, and wherein said straight line scanning locus is on a plane passing through said center of curvature, and perpendicular to said axis of rotation to produce a substantially distortion free straight line locus.

2. A scanning system, comprising a light source, directed in a light path, scanning means having an axis of rotation for rotationally scanning said light source through a curvilinear locus, means for focusing the light source on an imaging means, means for receiving said light from said scanning means and redirecting said light at an angle with reference to the incident light and to a straight line scanning locus, said redirecting means having a center of curvature located on a plane passing through the said straight line scanning locus and wherein said plane is perpendicular to said axis of rotation of said scanning means to produce a substantially distortion free straight line locus.

3. The system of claim 2, wherein said imaging means is in the plane of said straight line scanning locus.

4. The system of claim 3, wherein said redirecting means is a spherical chordal segment reflector.

5. The system of claim 4, wherein said redirecting means is an off-axis spherical compensating mirror.

6. The system of claim 5, wherein said light source is a laser, and said light path include a beam expander, said focusing means focusing said light from said beam expander to a point on said imaging surface.

7. The system of claim 6, wherein said scanning means includes a rotating mirror.

8. An imaging system having a raster scanning means for scanning a light sensitive surface with an information containing light beam for imaging said information on said surface, said system having means for moving said light in a scan across the surface, modulating means for modulating said beam, and means for directing said modulated light beam to said surface, said system comprising an optical light path between said light source and said surface, and said modulation producing at least two angularly separated beams having respective free beam paths overlapping each other at least up to a predetermined distance from an output of said modulating means and wherein said means for directing said modulated light includes means separating said overlapping beam paths and blocking one of said beams, said separating means being placed in said free beam overlapping paths and within said predetermined distance from said modulator output, and including means providing digitized information signals, having means for providing first digital data defining the identity and location of characters, font storage means providing data defining the contour of a plurality of chracters with respect to a normalized encoded set of first and second coordinates, and digital processing means connected to said first and second digital data for producing third digital data defining said characters for modulating said light beam responsive to said digitized information.

9. An imaging system having a raster scanning means for scanning a light sensitive surface with an information containing light beam for imaging said information on said surface, said system having means for moving said light in a scan across the surface, modulating means for modulating said beam, and means for directing said modulated light beam to said surface, said system comprising an optical light path between said light source and said surface, and said modulation producing at least two angularly separated beams having respective free beam paths overlapping each other at least up to a predetermined distance from an output of said modulating means and wherein said means for directing said modulated light includes means separating said overlapping beam paths and blocking one of said beams, said separating means being placed in said free overlapping paths and within said predetermined distance from said modulator output, and wherein said means for blocking is an apertured light stop placed within said means to pass light from a first of said angularly separated beams and to block light from a second of said angularly separated beams.

10. The system of claim 9, wherein said means for directing is a beam expander placed to receive the modulator output.

11. The system of claim 10, wherein said beam expander has means for focusing said angularly separated beams on a focal plane and said apertured light stop is on said focal plane.

12. The system of claim 11, wherein said beam expander includes means for imaging one of said beams on said aperture and includes means for reimaging said focused beam on said light sensitive surface.

13. An imaging system having a raster scanning means for scanning a light sensitive surface with an information containing light beam for imaging said information on said surface, said system having means for moving said light in a scan across the surface, modulating means for modulating said beam, and means for directing said modulated light beam to said surface, said system comprising an optical light path between said light source and said surface, and said modulation producing at least two angularly separated beams having respective free beam paths overlapping each other at least up to a predetermined distance from an output of said modulating means and wherein said means for directing said modulated light includes means separating said overlapping beam paths and blocking one of said beams, said separating means being placed in said free beam overlapping paths and within said predetermined distance from said modulator output, and wherein said means for directing said light includes means for focusing said light on a focal plane and said means for blocking is located on said focal plane.

14. The system of claim 13, wherein said means for blocking is an apertured light stop.

15. The system of claim 14, wherein said means for directing is a beam expander and said means for focusing is placed opposite the modulator output.

16. An electrophotographic typesetter system having a raster scanning means for scanning a light sensitive surface with an information containing light beam and having a light source, a modulator for said light beam responsive to a succession of signals, said modulator producing at least two angularly separated beams having free beam paths overlapping each other up to a predetermined distance from said modulator output, a beam expander having means for blocking at least one of said beams, and wherein said means for blocking is an apertured light stop, said beam expander having means for focusing and said light stop placed in the focal plane of said focusing means.

17. The system of claim 16, wherein said beam expander is placed opposite said modulator output.

18. The system of claim 17, wherein said focusing means images at least one of said beams at said aperture and said system includes means for reimaging said beam on said light sensitive surface.

19. The system of claim 18, wherein one of said angularly separated beams is a zero order beam and said other beams is a first order beam and said aperture is placed in the path of said first order beam and said light stop blocks said zero order beam.

* * * * *

UNITED STATES PATENT AND TRADEMARK OFFICE
CERTIFICATE OF CORRECTION

PATENT NO. : 4,305,646
DATED : December 15, 1981
INVENTOR(S) : Edwin Bechtold

It is certified that error appears in the above-identified patent and that said Letters Patent are hereby corrected as shown below:

```
Column 1, line 27, after "light" insert --source--.
Column 2, line 3, "to" should be deleted;
          line 29, change "electrostatagraphic to
--electrostatographic--.
Column 4, line 2, change "be" (2nd. occurrence) to --by--.
          line 41, after "below," insert --which--.
Column 5, line 31, change "existing" to --exiting--.
Column 6, line 64, change "In" to --in--.
Column 7, line 56, after "receive" insert --liquid--.
Column 14, line 18, change "chracters" to --characters--;
           line 42, after "means" insert --for directing--.
```

Signed and Sealed this

Seventh Day of September 1982

[SEAL]

Attest:

GERALD J. MOSSINGHOFF

*Attesting Officer*      *Commissioner of Patents and Trademarks*